United States Patent

[11] 3,614,021

[72] Inventor Richard M. Davidson
Northbrook, Ill.

[21] Appl. No. 780,096
[22] Filed Nov. 29, 1968
[45] Patented Oct. 19, 1971
[73] Assignee Bell & Howell Company
Chicago, Ill.

[54] RECORD-HANDLING DEVICE
13 Claims, 2 Drawing Figs.

[52] U.S. Cl. .......... 242/188, 242/203
[51] Int. Cl. .......... B65h 25/00, B65h 25/32, G03b 1/42
[50] Field of Search .......... 242/56, 57, 188, 190, 199, 201, 203, 206; 226/34, 44, 45, 52, 115–117, 125, 154, 162

[56] References Cited

UNITED STATES PATENTS

| | | | |
|---|---|---|---|
| 2,416,210 | 2/1947 | Osborne | 242/188 |
| 2,683,568 | 7/1954 | Lindsay | 242/188 |
| 2,998,939 | 9/1961 | Scott | 242/188 |
| 3,115,314 | 12/1963 | Manley et al. | 242/57 X |
| 3,184,177 | 5/1965 | Hannah | 242/188 |
| 3,303,981 | 2/1967 | Wiese | 226/115 X |
| 3,423,037 | 1/1969 | Good | 226/56 X |
| 3,511,562 | 5/1970 | Leisring | 226/45 X |

*Primary Examiner*—Donald E. Watkins
*Attorney*—William F. Pinsak

ABSTRACT: An accessory enables a device with a drive for moving successive record cards past a transducer, to advance adjoining record frames on a web past the transducer. Means in the accessory, in response to frame-defining means in the web, open an electrical circuit to stop the web frame by frame and enable manual reinitiation of web movement.

Inventor:
Richard M. Davidson

By William F. Pinsak Atty

RECORD-HANDLING DEVICE

The present invention relates to sound reproduction. Particularly, the invention relates to a record-handling device for linearly movable record cards.

A device such as a record player of the general class with which the present invention is concerned as disclosed in U.S. Pat. No. 2,603,006, issued July 15, 1952 to C. M. MacChesney et al. It is adapted for record cards of the type having a single band of magnetic medium for recorded indicia corresponding to audible intelligence. Because of the limited data which can be impressed on a record of the indicated type, a meaningful educational program for which the cards are particularly adapted requires repeated card handling.

It is an object of the present invention to provide an improved record-handling device of the described class.

It is an additional object of the invention to minimize manipulation of records when employing said device.

It is a further object of the invention to provide an improved record for said device.

It is another object of the invention to enable a record card handling device of the indicated class to handle a web comprised of adjoining record frames.

In accordance with the invention, an accessory for use with a record-handling device of the type having a continuous drive for moving successive record cards past a transducer for intelligence transfer is adapted for supporting a record web comprising a plurality of adjoining record frames in association with said drive for successively advancing said frames past the transducer. Means associated with said accessory and including electrical circuitry are adapted for stopping the web frame by frame. Means are adapted for selectively reinitiating web movement.

Further and other objects will be apparent from the description of the accompany drawings in which like numerals refer to like parts.

Figure 1:
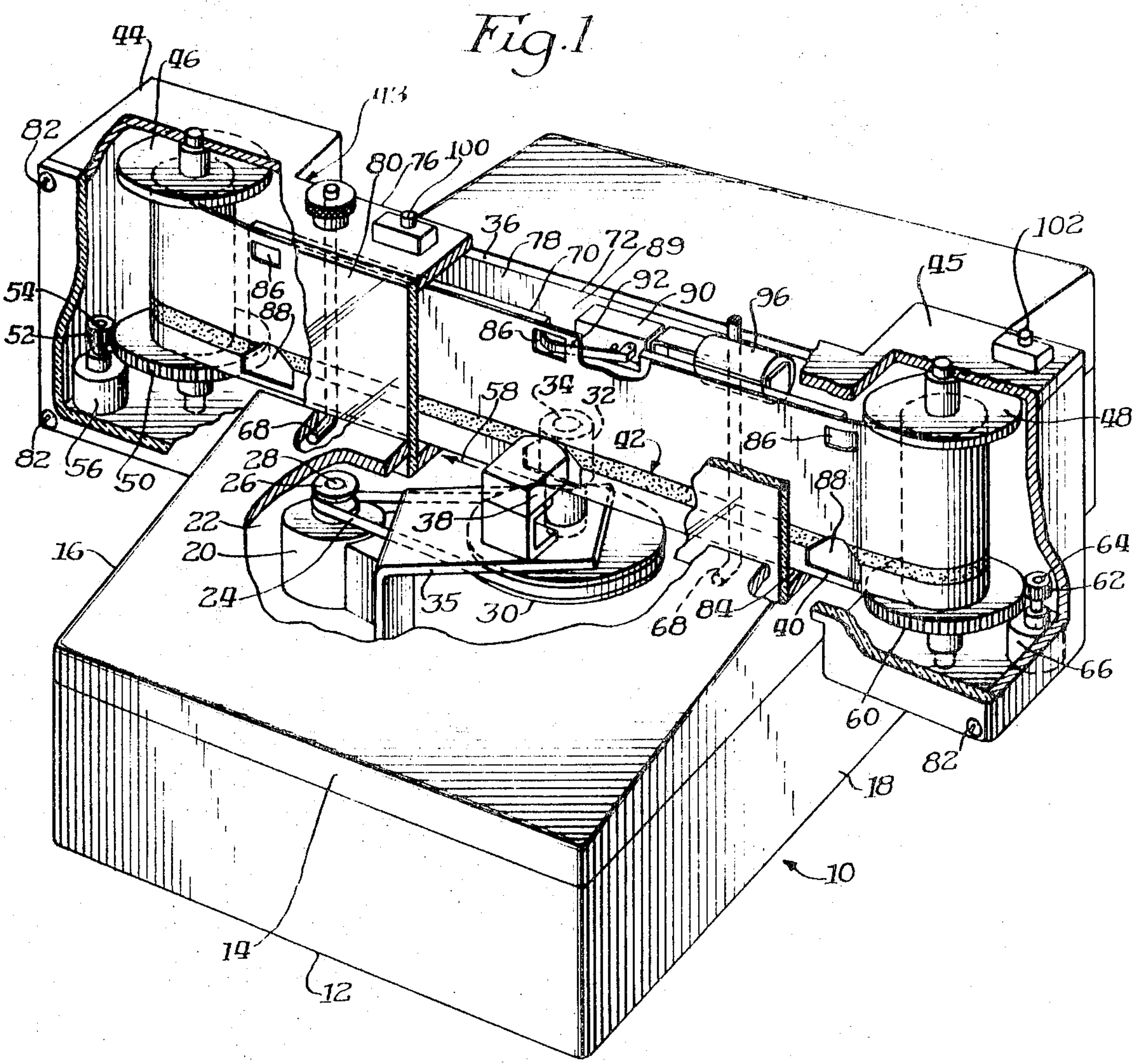
FIG. 1 is a perspective view of one embodiment of the invention, parts broken away and parts shown in dashed line for illustration.

Referring now more particularly to the drawings, there is shown only that portion of a record-handling device, such as a player or sound-reproducing device 10 which is essential to an understanding of the inventive concepts therein embodied. The record player comprises a casing 12 which is defined by a top wall or cover 14 and opposed vertical sidewalls 16 and 18. Casing 12 has a transverse medial recess 36 which extends from side 16 to side 18 and opens outwardly or upwardly.

A prime mover in the form of an electric motor 20 is mounted within a chamber 22 defined by casing 12. An endless belt 24 is entrained about a sheave 26, which is corotational with the output shaft 28 of motor 20, and a flywheel 30 for continuously driving a drive roller such as capstan 32. A post 34 which is drivably coupled to the flywheel extends from chamber 22 into recess 36 for drivably supporting capstan 32 in said recess medially of sidewalls 16 and 18.

A magnetic pickup head or transducer 38, which may be of conventional construction, herein comprises an intelligence transfer station and is supported in recess 36 adjacent capstan 32 by any suitable means, such as bracket assembly 35. The remainder of the sound reproduction apparatus is omitted from the drawings as its details of construction do not define or limit the invention. Suffice it to say, however, that the transducer is connected by means, which may be conventional to a power-supplied amplifier and a conventional sound-translating member for converting the electrical energy output of the transducer into audible intelligence.

Capstan 32 and transducer 38 are spaced from each other for disposition along opposite faces of a carrier 40 which is a coilable web. The spacing of the capstan, which is the primary carrier driving member, and the transducer is such that the carrier will be tractionally driven by the capstan as a band 42 of magnetic media disposed longitudinally of the carrier near one side thereof is engaged by transducer 38 for pickup of intelligence.

Record player 10 is adapted through the agency of capstan 32 to drive record cards of the type shown in the U.S. Pat. aforesaid, past transducer 38. However, in accordance with the present invention, an accessory comprising a hollow body 43 is elongated transversely of casing 12 and is proportioned for removable reception in groove 36. To stabilize the accessory in recess 36, any suitable clamp means 68 for releasably connecting body 43 and the casing 12 may be employed.

A pair of forwardly opening integral reel housings 44 and 45 are fashioned at opposite ends of body 43 and are proportioned so that they will depend adjacent sidewalls 16 and 18 when said body is operably arranged in recess 36. Moreover, said housings define a pair of chambers which are proportioned for holding therein a pair of journaled reels 46 and 48 at opposite sides of casing 12. Reels 46 and 48 comprise means for supporting carrier 40 for movement in a longitudinal path past or across transducer 38. In the present embodiment, reel 46 is a carrier takeup member and reel 48 is a carrier supply member. The parts are arranged and proportioned in a manner such that when body 43 is operably engaged in recess 36, it is adapted to support carrier 40 in driving association with capstan 32 for movement past transducer 38 for intelligence transfer.

A reel flange 50 of reel 46 perimetrically is fashioned as a gear which is operably enmeshed with drive gear 52. The latter is corotationally carried on drive shaft 54 of small electric unidirectional motor 56 which herein is shown mounted in the bottom of housing 44 and comprises an auxiliary drive for carrier 40. In the exemplary apparatus, the arrangement is such that the normal advancing direction of carrier 40 is in an elongated path 84 transversely of casing 12 in the direction of arrow 58.

If desired, the parts may be arranged for rewinding carrier 40 onto supply reel 48 so that sections of the carrier may be reconsidered in a manner and for purposes which will become apparent hereinafter. To that end, flange 60 of reel 48 may be perimetrically fashioned as a gear which is arranged in operable mesh with drive gear 62. The latter is corotationally secured on shaft 64 of electric unidirectional motor 66, which is shown mounted in the bottom of housing 45 and is adapted to move carrier 40 in a direction opposite to the direction indicated by arrow 58. The torque of motor 66 is sufficiently great to overcome the continuous torque of capstan 32 to enable rewinding of the carrier.

As fashioned, body 43 comprises a pair of parallel vertical front and back walls 70 and 72 and a top wall 76 which define a chamber 89 in said body. Wall 70 extends between housing 44 and 45 and its forward surface provides a flat along which carrier 40 can be drawn. A transparent cover 80 is secured at its opposite ends by means of suitable fasteners 82 to housing 44 and 45. It is slightly spaced from the wall 70 and therewith defines the path 84 which is elongated between housings 44 and 45 for moving carrier 40 between reels 46 and 48.

Carrier 40, in a preferred embodiment, is adapted for a plurality of pictures or visual intelligence (not shown), which are arranged in adjoining frames extending longitudinally of the web comprising said carrier. Said carrier has a plurality of frame-defining means herein comprised of a plurality of carrier perforating apertures 86 and windows 88. Apertures 86 are disposed at a common level near the upper side of carrier 40 and each is spaced from an adjoining aperture longitudinally of the carrier. Windows 88 are disposed at a common level through band 42 and each is spaced from an adjoining window longitudinally of said carrier. Each aperture 86 is aligned with an associated opening 88 to define a visual frame and a corresponding frame of magnetic material. In the present embodiment, the alignment is vertical as the carrier is transported in vertical aspect, as shown.

The size of each window 88 is such that when it is in one of its positions in path 84 adjacent transducer 38, no tractional force will be applied to carrier 40 by capstan 32. Thereby, transmission of the torque of the motor 20 through said capstan to the carrier terminates.

Simultaneously with interruption of the capstan drive, the drive on takeup reel 46 and, accordingly, carrier movement will be interrupted at the end of each frame. This enables a user or viewer to consider the visual material then before him in a still frame, the related audio material of which already has played.

Figure 2:
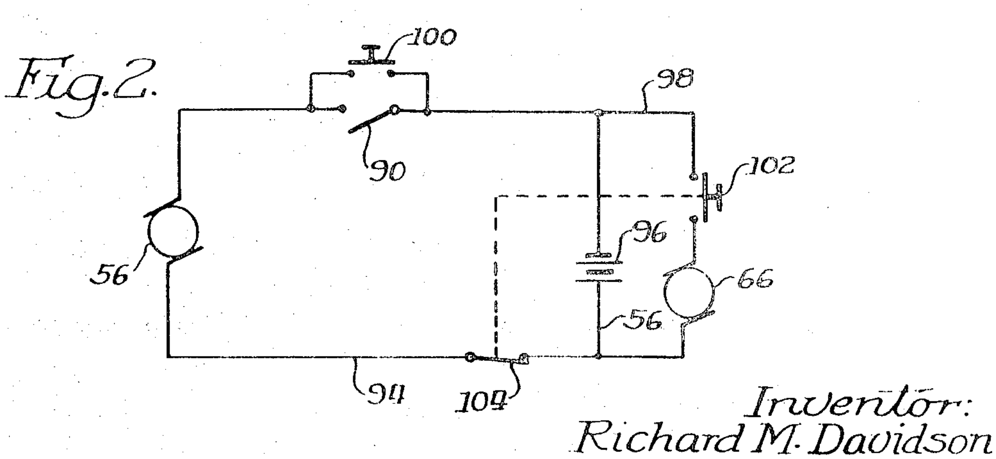
FIG. 2 is a scheme of an electrical circuit for operating said embodiment.

Drive on reel 46 is controlled by a switch 90 which is mounted within the chamber 78. It has a sensor 92 which extends through an accommodating opening in wall 70 for engagement with carrier 40. Switch 90 and sensor 92 are normally urged to a circuit-open condition. However, the parts are proportioned in a manner such that while sensor 92 engages carrier 40, it is supported for holding switch 90 in a circuit-closed condition. Sensor 92 is disposed at the level of apertures 86 and is proportioned so that it will loose carrier support at each of said apertures. Thereby, switch 90 will assume its normal condition (FIG. 2) at the end of each frame and in consequence of which an electrical circuit in circuitry 94 to motor 56 is opened. In the present embodiment, circuitry 94 is powered by a battery 96, which is also arranged as power source for circuitry 98 of motor 66.

A manually controlled, normally open, switch 100 is arranged in parallel with switch 90 and is adapted as a bypass therefor. That is to say, switch 100 may be selectively closed to energize the motor 56, notwithstanding the condition of sensor 92. Thereby, motor 56 can be energized even though sensor 92 is disposed in an aperture 86. The parts are arranged and proportioned in a manner such that the energy of battery 96 is sufficient for a short period to drive carrier 40 in consequence of activation of motor 56. To thusly reinitiate carrier movement, switch 100 need be kept closed only for a period sufficient to draw a window 88 away from the capstan whereafter normal capstan drive will undertake carrier transport through an ensuing frame.

A normally open switch 102 is manually operable so that motor 66 may be selectively actuated to rewind carrier 40 on reel 48 and thereby enable review of one or more frames of said carrier. To that end, circuitry 98 is arranged so that the motor 66 will drive as long as the switch 102 is held closed. Switch 102 is mechanically connected to a normally closed switch 104 in the circuitry 94 in a manner such that upon closure of switch 102, switch 104 will open, thereby to open circuitry 94. In this way, drive to motor 56 will be interrupted, regardless of the condition of sensor 92 and switch 100 as long as switch 102 is maintained in its closed condition. The foregoing arrangement ensures that the torque of motor 56 will not be added to the torque of the capstan when the carrier 40 is rewound.

In consequence of the foregoing construction, a conventional player for record cards readily can be adapted for playing a web of audible instructional material which is accompanied by visual intelligence and divided into frames corresponding to record cards, without requiring repeated card handlings. Moreover, although record manipulation is obviated, the rate of advancement of the frames is wholly under operator control through switch 100. Additionally, ready recapture of any already-played material is enabled without the need for record handling.

What is claimed is:

1. In an apparatus for handling a carrier for intelligence recorded in frames defined by means associated with and spaced longitudinally of said carrier, and having an intelligence transfer station, a combination comprising:
   - means for supporting the carrier for movement in a longitudinal path across said station;
   - a sensor fixed relative said station for detecting said frame-defining means;
   - means including electrical circuitry for moving the carrier and arranged for response to said sensor for interrupting carrier movement;
   - selectively controllable means for reinitiating carrier movement while said carrier-moving means is responsive to said sensor;
   - a casing having sidewalls;
   - a drive roller and a transducer comprising said transfer station and arranged in opposed relationship to define a path for a carrier; and
   - a pair of reel housings comprising said supporting means having lower portions disposed adjacent said sidewalls and having upper portions disposed for supplying and taking up a carrier moving in said path.

2. A combination according to claim 1 characterized in that said casing has an upwardly opening transversely extending recess; an elongated body supportingly carrying said reel housings in opposed positions and releasably mounted in said recess for engaging a carrier in said path.

3. Audiovisual instructional apparatus comprising;
   - a record player including a continuously driven drive roller and an intelligence pickup head spaced to define therebetween a longitudinally extending web path;
   - a web supported for movement longitudinally of said path;
   - a band of first indicia representing audible intelligence arranged longitudinally of said web at the level of said band;
   - visual indicia arranged on said web and corresponding to the audible intelligence, said first indicia and visual indicia arranged in adjacent information frames;
   - said web disposed in tractional engagement with said roller and first indicia sensing engagement with said pickup head;
   - said web having a plurality of windows disposed at the level of said roller for interrupting said tractional engagement frame by frame and a plurality of openings defining said frames;
   - a sensor mounted for movement between a first condition in which said openings are detected and a second condition in which said sensor is supported by said web;
   - reversibly drivable means arranged at opposite ends of said path for supplying and taking up said web and responsive to said sensor when in its first condition for interrupting torque on said web; and
   - means for manually reactivating said drivable means while said sensor is in said first condition.

4. In an apparatus for handling a carrier having intelligence recorded in frames spaced longitudinally thereof, a combination comprising:
   - a transducer station including a driven roller and a transducer head cooperating to move said carrier relative thereto in a predetermined direction;
   - means for supporting the carrier for movement in a longitudinal path across said station;
   - said carrier having a plurality of apertures spaced in the path of said transducer station for interrupting the carrier movement at preselected intervals therealong; and
   - selectively controllable means including an auxiliary drive operatively connected to said carrier supporting means for reinitiating carrier movement in said predetermined direction.

5. A combination as defined in claim 4 wherein said selectively controllable means includes a manually operable switch for activating said auxiliary drive for moving said carrier into tractional engagement with said transducer station.

6. A combination as defined in claim 4 wherein said supporting means includes a casing having a pair of housing portions spaced from each other with said transducer station located therebetween, and a carrier takeup reel supported in one of said housing portions and a carrier supply reel supported in the other of said housing portions, and said auxiliary drive supported in said takeup reel housing portion and connected to said takeup reel for winding said carrier therein.

7. A combination as defined in claim 4 wherein the space between a pair of said plurality of apertures defines a frame of recorded intelligence.

8. A combination as defined in claim 7 wherein said frame of recorded intelligence includes a magnetic medium strip for audible intelligence terminating at each of said pair of said plurality of apertures.

9. A combination as defined in claim 4 further comprising a second selectively controllable means including a second auxiliary drive for moving said carrier in a direction opposite said predetermined direction.

10. A combination as defined in claim 9 wherein said second selectively controllable means includes a second manually operable switch for deactivating said first-mentioned selectively controllable means and for activating said second auxiliary drive.

11. A combination as defined in claim 4 further comprising a sensor means operable to automatically deactivate said auxiliary drive when said transducer station enters any one of said plurality of apertures in said carrier.

12. A combination as defined in claim 11 wherein said sensor means includes a second aperture in said carrier corresponding to each of said plurality of apertures, and a sensor operable to enter said second aperture to deactivate said auxiliary drive substantially simultaneously when said transducer station enters one of said plurality of apertures in said carrier.

13. A combination as defined in claim 10 wherein said selectively controllable means includes a manually operable switch to bypass said sensor means for activating said auxiliary drive for reinitiating carrier movement in said predetermined direction.